July 12, 1938.  E. R. FEEHRER ET AL  2,123,355
MEASUREMENT OF ECCENTRICITY OF HOLLOW SHAFTING
Filed April 15, 1936  3 Sheets-Sheet 2
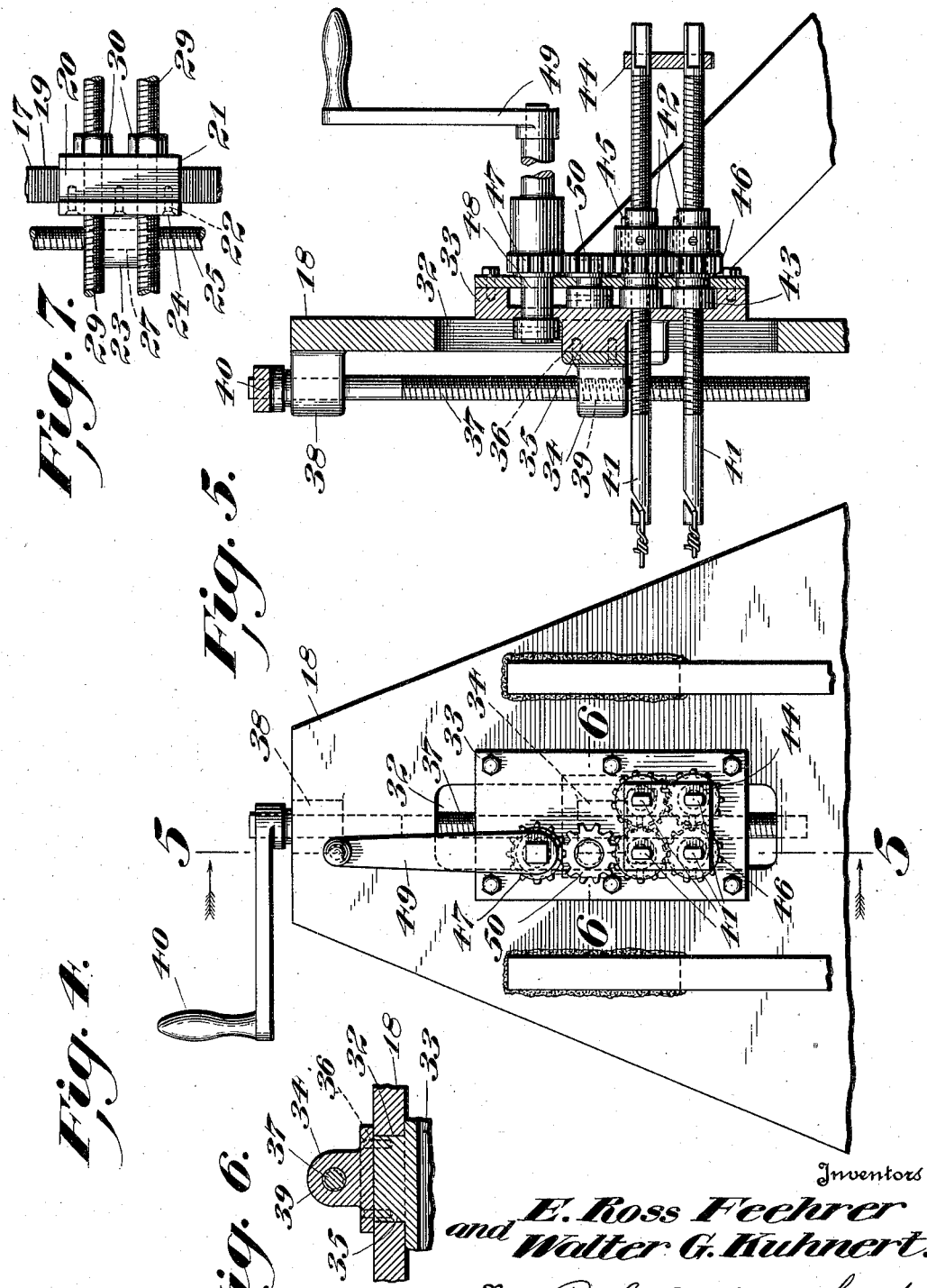
Inventors
E. Ross Feehrer
and Walter G. Kuhnert.
By R. S. Ce. Dougherty.
Attorney

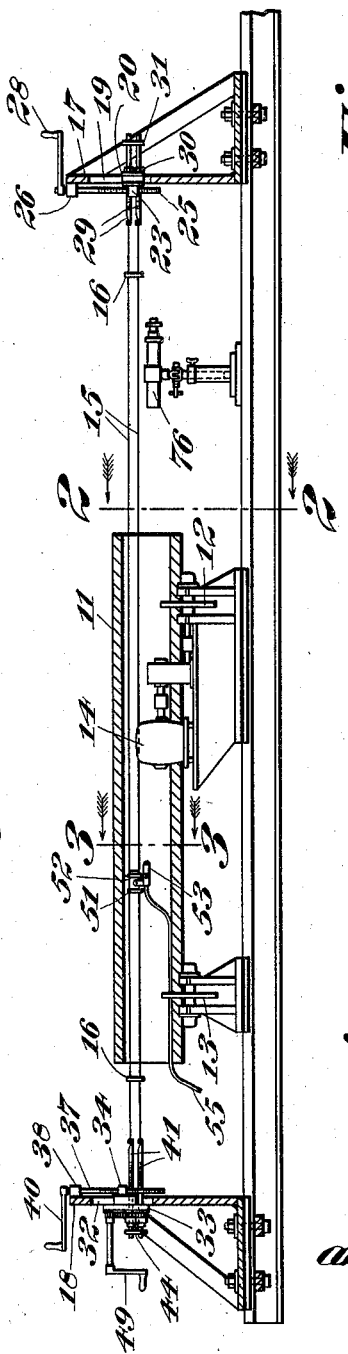

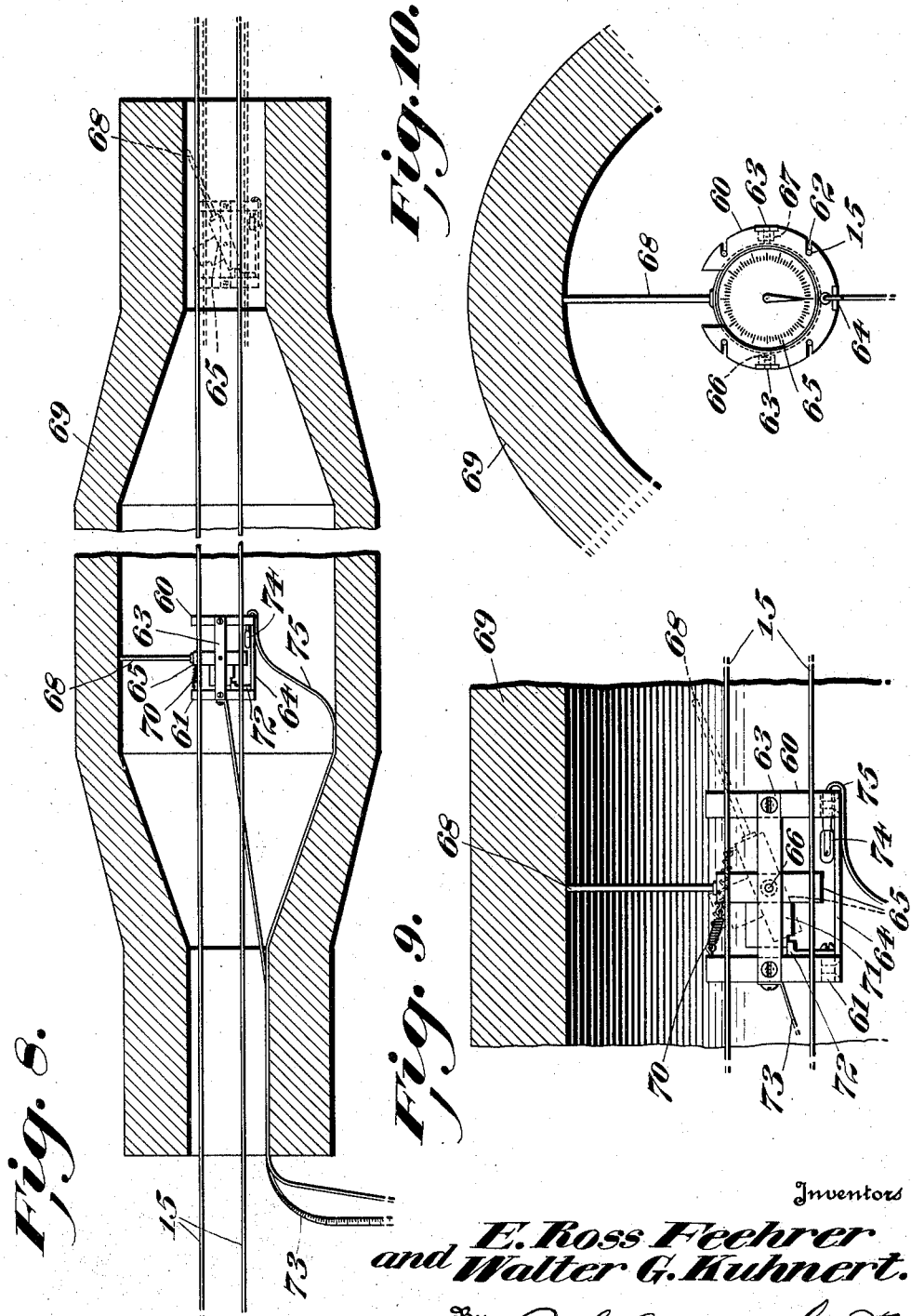

Patented July 12, 1938

2,123,355

UNITED STATES PATENT OFFICE 2,123,355

MEASUREMENT OF ECCENTRICITY OF HOLLOW SHAFTING

Edwin Ross Feehrer and Walter G. Kuhnert, Steelton, Pa., assignors to Bethlehem Steel Company, a corporation of Pennsylvania Application April 15, 1936, Serial No. 74,434

13 Claims. (Cl. 33—178)

This invention relates to apparatus for measuring the bore of hollow shafting.

It is an object of this invention to provide means for determining the presence of and the amount of eccentricity in the bore of a hollow shaft at any point along the length thereof.

It is a further object to provide means for determining accurately the locations of the several points along the length of a hollow shaft, at which such measurements are taken.

The novel features of our invention will be more fully understood from the following description and claims, taken with the drawings, in which Fig. 1 is a side elevation of our invention, partially in section;

Fig. 2 is a section along the line 2—2 of Fig. 1;

Fig. 3 is an enlarged fragmentary section along the line 3—3 of Fig. 1;

Fig. 4 is an enlarged end elevation of one of the anchor members forming a part of our invention;

Fig. 5 is a view in section along the line 5—5 of Fig. 4;

Fig. 6 is a fragmentary view in section along the line 6—6 of Fig. 4;

Fig. 7 is an enlarged view of a portion of the other anchor member;

Fig. 8 is a longitudinal section of a tapered-end shaft, and showing a modified form of our invention;

Fig. 9 is an enlarged view of the modified form of our invention shown in Fig. 8;

Fig. 10 is an end elevation of the modified form of our invention shown in Fig. 9.

Referring now to Fig. 1, the hollow shaft 11 is shown mounted on driven roller 12 and non-driven rollers 13. Roller 12 is driven by motor 14. The places (not shown) on the shaft which rest on the rollers are so-called "true spots" which are used in the machining operation for steady rest supports and for reference points in setting the shaft. Four smooth and fairly heavy wires 15 are stretched through the bore of shaft 11 and are held in position relative to each other by spacers 16. At one end wires 15 are connected to anchor member 17 and at the other end to anchor member 18. Vertical threaded bolt 25 passes through bracket 26, secured at the top of anchor member 17, and threadedly engages the threaded portion 27 of bracket 23. By turning crank 28, block 20 and wires 15 may be raised or lowered in slot 19. Four threaded bolts 29 to which the ends of wires 15 are secured, pass through block 20 and nuts 30. The outer ends of bolts 29 which are rectangular are mounted in plate 31 to prevent rotation of the bolts. Thus, by turning nuts 30, tension on each one of wires 15 can be individually adjusted.

Vertically slidable in slot 32 in anchor member 18 is housing 33 which is held in the slot by flanged bracket 34. Bracket 34 is secured to guide-portion 35 of housing 33 by screws 36. Vertical threaded bolt 37 passes through bracket 38 secured at the top of anchor member 18 and threadedly engages the threaded portion 39 of flanged bracket 34. By turning crank 40, housing 33 and wires 15 may be raised or lowered in slot 32. Four threaded bolts 41 pass through and engage threaded collars 42, the head portions 43 of which are enclosed within housing 33.

The outer ends of bolts 41 are also rectangular and are mounted in plate 44 to prevent their rotation. Mounted on collars 42 and keyed thereto by keys 45 are spur gears 46. Gear 47 mounted on shaft 48 in housing 33 is turned by crank 49 and, through gear 50, also mounted on housing 33, turns all four spur gears 46 simultaneously. Through the interaction of these parts, the tension on all four wires 15 may be adjusted in one movement, because threaded collars 42, keyed to spur gears 46, are caused to revolve and move bolts 41 inwardly or outwardly, as desired, to tighten or loosen wires 15.

Mounted on wires 15 and slidable thereon is carrier 51, which supports dial micrometer gauge 52 and incandescent lamp 53. Pin 54, which protrudes vertically from the top of gauge 52, engages the inner wall of hollow shaft 11 and actuates the pointer on the gauge. Lamp 53 is blackened at its outer end in order to eliminate glare in the eyes of the observer while still lighting the dial of the gauge. Electric cord 55 supplies current to lamp 53 and at the same time serves as a means for sliding carrier 51 along wires 15.

In the modified form of our device, as shown in Figs. 8, 9 and 10, the structure is the same as hereinbefore described, except as regards the carrier and gauge assembly. In this form the carrier comprises ring member 60 and circular plate 61, both of which have grooves 62 adapted to receive wires 15. Side pieces 63 and bottom piece 64 which are riveted to ring member 60 and plate 61 serve to join the two latter members and hold them in position relative to each other. Between ring member 60 and plate 61 dial micrometer gauge 65 is mounted by means of lugs or pins 66 which engage bosses 67 on side pieces 63. Pin 68, when the gauge is in operative position, protrudes vertically from the gauge and engages the bore of hollow shaft 69 to actuate the pointer on the gauge. Spring 70 serves to hold gauge 65 in vertical position. Stop member 71, fastened to the back of gauge 65, engages shoulder 72, screwed to plate 61, to prevent rearward movement of gauge 65 beyond the vertical position. Measuring tape 73 may be used to slide the carrier along wires 15, and at the same time it shows the position of the carrier within the shaft. As shown in dotted lines in Figs. 8 and 9, when the carrier enters the mouth of tapered-end shaft 69, gauge 65 swings forward on lugs 66, to permit passage through the mouth of the shaft. As the bore of the shaft widens out, gauge 65 is returned to the vertical position by the tension exerted by spring 70. Incandescent lamp 74 which is supplied with current by means of cord 75 serves to illuminate the dial on gauge 65.

Having described the construction of the several parts and their relative position with each other, we will now describe the operation of our invention.

The hollow shaft 11 to be tested is laid on rollers 12 and 13. Wires 15 are threaded through the bore of shaft 11 from anchor 17 and are secured at the other end to anchor 18, and the tension on wires 15 adjusted by means of crank 49 and nuts 30. By means of cranks 28 and 40 wires 15 may then be adjusted vertically so that they are substantially parallel to the bore of shaft 11 although extreme care in this respect is not necessary. After wires 15 have been adjusted they have no contact with shaft 11.

Carrier 51 is then slid along wires 15 until gauge 52 is just inside the bore of shaft 11. Wires 15 are adjusted vertically at both ends so that the contact point of pin 54 just touches the uppermost part of the bore of shaft 11. Shaft 11 is then rotated very slowly by means of motor 14 which drives roller 12.

If the bore of shaft 11 is exactly concentric with the "true spots" on the outside of the shaft, the reading of dial gauge 52 will not change as the shaft rotates. If, however, there is any eccentricity of the bore, the reading of dial gauge 52 will decrease or increase as the high or low sides of the bore come uppermost. The difference between the maximum and minimum readings of dial gauge 52 is the difference between the maximum and minimum wall thicknesses of shaft 11. These maximum and minimum wall thicknesses are usually 180° apart, and thus half the difference between them, as shown by dial gauge 52, is the eccentricity of the shaft under observation.

Gauge 52 can be slid along wires 15 to any point in the length of shaft 11 at which an observation of eccentricity may be desired, and with light 53 reflecting against the face of dial gauge 52, its readings can easily be ascertained by observation through telescope 76, shown in Fig. 1. By means of the measuring tape 73 shown in Fig. 8, the position along the length of shaft 11 at which each observation of eccentricity is made, may be determined with considerable accuracy.

As shown in Fig. 2, the letters, A, B, C and D are painted on the end of shaft 11 and serve as reference marks for the use of the observer in locating the eccentricity circumferentially. At one end of the shaft 11 side "A" may be the thinnest portion, while at the middle or at the opposite end conditions may have changed so that the thinnest portion will be on side "B".

The operation of the modified form of our invention shown in Figs. 8, 9 and 10 is the same as just described, except that dial gauge 65 is there so arranged as to permit it to swing forward, allowing passage through the tapered end of shaft 69, after which it swings back into operative position.

It should be noted that if there is any sag in the group of four wires, or if they are not exactly parallel to the bore, it will not affect the determination of the eccentricity at any point along the length of the shaft, as the eccentricity is determined entirely from the difference between the maximum and minimum readings of the dial gauge at each point of observation.

Having thus described our invention, what we claim and desire to secure by Letters Patent is:

1. An apparatus for measuring the bore of a hollow shaft comprising supporting means adapted to be positioned interiorly of the bore of a shaft, measuring and indicating means movably mounted on said supporting means, anchor means positioned externally of the shaft for holding said supporting means in operative position within the shaft, means for supporting the shaft and rotating means for changing the operative positions of said measuring and indicating means and said shaft relative to each other.

2. An apparatus for measuring the bore of a hollow shaft comprising a plurality of wires adapted to be threaded through the bore of a shaft, a micrometer gauge slidably mounted on said wires, a pin projecting from said gauge to engage the inner face of said shaft, means positioned externally of the shaft for holding said wires in operative position within the shaft, means for supporting the shaft, and rotating means for selectively changing the point on the inner face of the shaft which is engaged by said pin.

3. An apparatus for measuring the bore of a hollow shaft comprising supporting means adapted to be positioned interiorly of the shaft, means external of the shaft for holding said supporting means in operative position relative to the bore of the shaft, measuring and indicating means mounted on said supporting means adapted to engage the inner face of the shaft and means for rotatably supporting the shaft.

4. An apparatus for measuring the bore of a hollow shaft comprising flexible supporting means, means for holding said flexible supporting means in operative position relative to the bore of the shaft, measuring and indicating means slidably mounted on said flexible supporting means and means for rotatably supporting the shaft.

5. An apparatus for measuring the bore of a hollow shaft comprising a plurality of horizontally disposed wires, a micrometer gauge mounted thereon, said micrometer gauge being adapted to be drawn along said wires throughout the full length of the shaft, anchor means positioned externally of the shaft for holding said wires in operative position within the shaft, and means to support the shaft.

6. An apparatus for measuring the bore of a hollow shaft comprising a plurality of horizontally disposed wires adapted to be disposed interiorly of the shaft and extending throughout the full length thereof, a micrometer gauge slidably mounted on said wires, anchor means for holding said wires in operative position within the shaft, and means to rotatably support the shaft.

7. In an apparatus for measuring the bore of a hollow shaft the combination with a plurality of horizontally disposed wires adapted to be threaded through the bore of the shaft, of a gauge mounted on said wires having a projecting pin adapted to engage the inner face of the shaft, means positioned at each end of the shaft for holding said wires in operative position with the shaft, and means for rotatably supporting the shaft, said gauge while in operative position being adapted to indicate the movements of said pin.

8. An apparatus for measuring the bore of a hollow shaft comprising flexible track means, a micrometer gauge slidably mounted on said track means, means positioned externally of the shaft for holding said track means in operative position within the shaft, and means for rotatably supporting the shaft.

9. An apparatus for measuring the bore of a hollow shaft comprising flexible track means, measuring means mounted on said track means, means for supporting said flexible track means and means for mounting the shaft rotatably relative to said measuring means.

10. An apparatus for measuring the bore of a hollow shaft comprising flexible track means, measuring means slidably mounted on said track means, means for supporting and means for tensioning said flexible track means, and means for rotatably supporting the shaft.

11. An apparatus for measuring the bore of a hollow shaft comprising a plurality of wires, means external of the shaft for supporting said wires, a micrometer gauge mounted on said wires, means for adjusting the position of said wires vertically, and means for mounting the shaft rotatably relative to said gauge.

12. An apparatus for measuring the bore of a hollow shaft comprising means to rotatably support the shaft, track means extending through the shaft, means positioned at each end of the shaft for supporting the track means, and a micrometer gauge slidably mounted on said track means for engaging the inner face of the shaft.

13. An apparatus for measuring the bore of a hollow shaft having tapered portions, comprising flexible track means adapted to extend through the shaft, a carrier frame mounted on said flexible track means, a gauge swingably mounted in bosses on said carrier frame, means for holding said flexible track means in operative position within the shaft, and means for rotatably supporting said shaft, said gauge being adapted to swing out of operative position to permit its passage through said tapered portions.

WALTER G. KUHNERT.
E. ROSS FEEHRER.